United States Patent
Hirasawa et al.

(10) Patent No.: US 12,449,651 B2
(45) Date of Patent: Oct. 21, 2025

(54) JOINT RING, MANUFACTURING METHOD OF JOINT RING, AND MANUFACTURING METHOD OF BENDING TUBE FOR ENDOSCOPE

(71) Applicant: OLYMPUS MEDICAL SYSTEMS CORP., Tokyo (JP)

(72) Inventors: Yoshihiro Hirasawa, Hachioji (JP); Hiroyuki Seki, Hachioji (JP); Tomonori Imamura, Hino (JP)

(73) Assignee: Olympus Medical Systems Corp., Tokyo (JP)

(*) Notice: Subject to any disclaimer, the term of this patent is extended or adjusted under 35 U.S.C. 154(b) by 348 days.

(21) Appl. No.: 18/099,582

(22) Filed: Jan. 20, 2023

(65) Prior Publication Data

US 2023/0235767 A1 Jul. 27, 2023

Related U.S. Application Data

(60) Provisional application No. 63/302,627, filed on Jan. 25, 2022.

(51) Int. Cl.
*A61B 1/00* (2006.01)
*G02B 23/24* (2006.01)

(52) U.S. Cl.
CPC ................. *G02B 23/2476* (2013.01)

(58) Field of Classification Search
CPC ..... A61B 1/005; A61B 1/0055; A61B 1/0056; A61B 1/0057; A61B 1/0011; G02B 23/2476
See application file for complete search history.

(56) References Cited

U.S. PATENT DOCUMENTS

| 5,179,935 A * | 1/1993 | Miyagi ................ A61B 1/0055 600/150 |
| 2011/0030194 A1 | 2/2011 | Kitagawa et al. |
| 2014/0018776 A1 | 1/2014 | Takeuchi et al. |

FOREIGN PATENT DOCUMENTS

| CN | 103874452 A | 6/2014 |
| JP | 2007-151887 A | 6/2007 |
| JP | 2007-159636 A | 6/2007 |
| JP | 2014-030661 A | 2/2014 |
| WO | 2022/003889 A1 | 1/2022 |

OTHER PUBLICATIONS

Office Action dated Aug. 14, 2025, issued in corresponding Chinese Patent Application No. 202211693849.2.

* cited by examiner

*Primary Examiner* — Timothy J Neal
(74) *Attorney, Agent, or Firm* — Morgan, Lewis & Bockius LLP

(57) ABSTRACT

A joint ring of an endoscope comprises a joint ring body including a joint ring wall having an inner surface, an outer surface, a first end surface, and a second end surface, and a first wire guide attached to the inner surface of the joint ring wall. The first wire guide includes a first wire guide body including a first wire guide wall having a third end surface and a fourth end surface. In a central axis direction of the joint ring body, at least a first portion of the first end surface and at least a first portion of the third end surface are at a first axial position and at least a first portion of the second end surface and at least a first portion of the fourth end surface are at a second axial position.

16 Claims, 13 Drawing Sheets

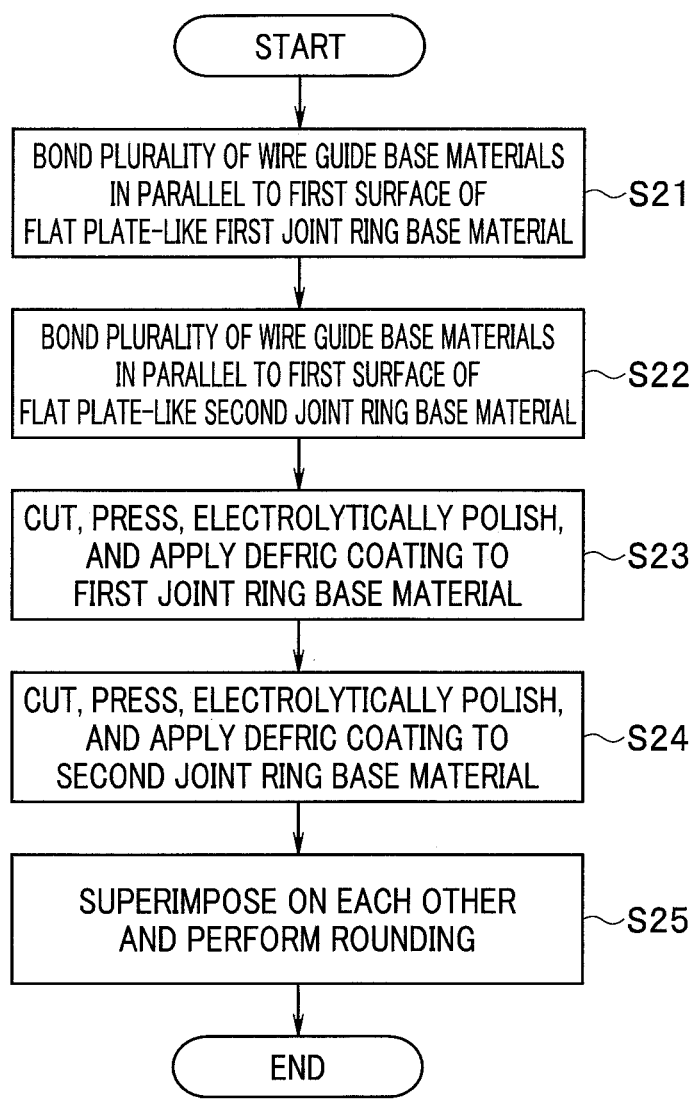

JOINT RING, MANUFACTURING METHOD OF JOINT RING, AND MANUFACTURING METHOD OF BENDING TUBE FOR ENDOSCOPE

RELATED APPLICATION DATA

This application is based on and claims priority under 35 U.S.C. § 119 to U.S. Provisional Application No. 63/302,627 filed on Jan. 25, 2022, the entire contents of which are incorporated herein by reference.

FIELD OF THE DISCLOSURE

The present disclosure relates to a joint ring in which a wire guide is bonded to a joint ring main body, a manufacturing method of the joint ring, and a manufacturing method of a bending tube for endoscope including a plurality of joint rings.

DESCRIPTION OF THE RELATED ART

There is a type of endoscope in which an insertion portion is provided with a bending portion for changing a direction of a distal end portion. The bending portion is configured by internally coupling a plurality of joint rings in a rotatable manner. Manufacturing methods of joint rings provided inside the bending portion have been conventionally proposed.

For example, Japanese Patent Application Laid-Open Publication No. 2007-159636 describes deforming a part of each individual joint ring by pressing to form a wire receiver (wire guide).

SUMMARY OF THE DISCLOSURE

A joint ring according to an aspect of the present disclosure is a joint ring of an endoscope comprises a joint ring body including a joint ring wall having an inner surface, an outer surface, a first end surface, and a second end surface, and a first wire guide attached to the inner surface of the joint ring wall. The first wire guide includes a first wire guide body including a first wire guide wall having a third end surface and a fourth end surface. In a central axis direction of the joint ring body, at least a first portion of the first end surface and at least a first portion of the third end surface are at a first axial position and at least a first portion of the second end surface and at least a first portion of the fourth end surface are at a second axial position.

According to an aspect of the present disclosure is a method of manufacturing a joint ring, comprising attaching a plurality of wire guide base material to a joint ring base material, with the plurality of wire guide base material attached to the joint ring base material, forming a tubular joint ring base material, and cutting the tubular joint ring base material to manufacture the joint ring. In the tubular joint ring base material, each of the plurality of wire guide base material extends along a central axis of the tubular joint ring base material and each of the plurality of wire guide base material is spaced apart in a circumferential direction on an inner surface of the tubular joint ring base material.

BRIEF DESCRIPTION OF THE DRAWINGS

FIG. 18 is a flow chart for explaining the manufacturing method of a bending tube according to the third embodiment of the present disclosure.

DETAILED DESCRIPTION OF THE EMBODIMENTS

Generally, in an example in which a bending tube that is bent using four wires is made up of 10 joint rings (or joint ring bodies), a total of 40 wire guides are to be provided on the joint rings. Providing each joint ring with one wire guide at a time may require, for example, 40 manufacturing processes, which makes processing cumbersome and complicated and increases cost. In addition, variations may occur in mounting positions of wire guides among the plurality of joint rings.

According to the embodiments described hereinafter, a joint ring to which a wire guide is mounted with high positioning accuracy, a manufacturing method of a joint ring that enables the joint ring to be manufactured at high efficiency and low cost, and a manufacturing method of a bending tube for endoscope that enables a bending tube including a plurality of joint rings to be manufactured at high efficiency and low cost can be provided.

Hereinafter, embodiments of the present disclosure will be described with reference to the drawings. However, it is to be understood that the present disclosure is not limited to the embodiments described below.

In the description of the drawings, same or corresponding elements are denoted by same reference signs as appropriate. In addition, note that drawings are schematic and a relationship among lengths of respective elements, a ratio among lengths of respective elements, a quantity of each element, and the like in a single drawing may differ from reality for the sake of brevity of description. Furthermore, even among a plurality of drawings, the drawings may include portions having a relationship or a ratio among lengths that differ from each other.

First Embodiment

Figure 1:
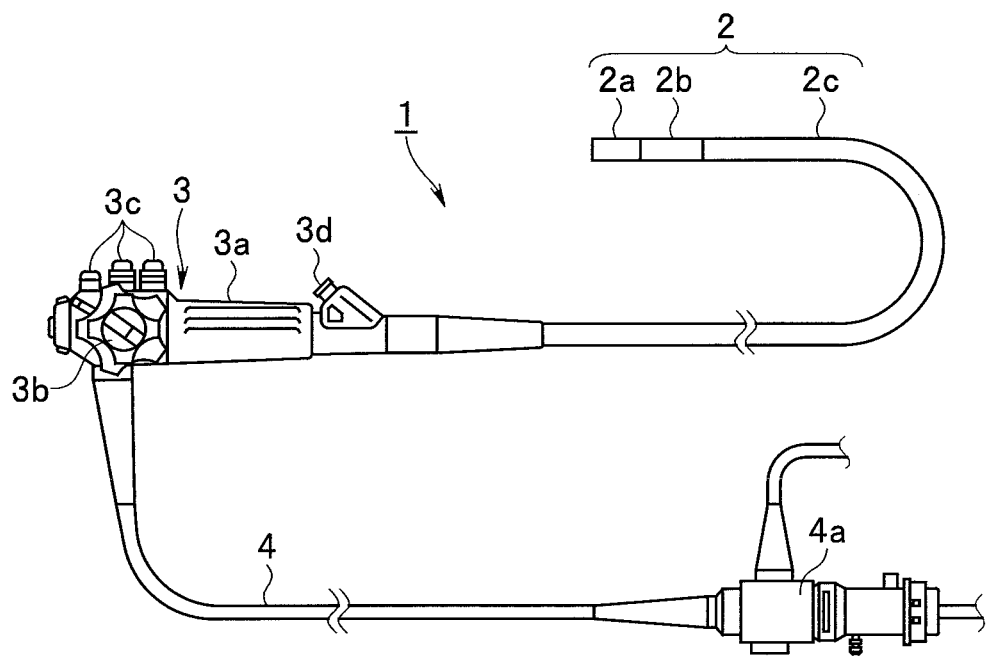
FIG. 1 is a diagram showing a configuration example of an endoscope according to a first embodiment of the present disclosure.

FIGS. 1 to 10 represent a first embodiment of the present disclosure, in which FIG. 1 is a diagram showing a configuration example of an endoscope 1 according to the first embodiment.

The endoscope 1 is a device for performing an observation and treatment of an object. The endoscope 1 includes an insertion portion 2 that is inserted into the object, an operation portion 3 that is consecutively provided on a side of a proximal end of the insertion portion 2, and a universal cable 4 that is extended from the operation portion 3. Note that the object into which the insertion portion 2 is inserted may be a living object such as a person/human being or an animal or a non-living object such as a machine or a building and is not limited to a specific subject.

The insertion portion 2 includes, in order from a distal end toward a proximal end, a distal end portion 2a, a bending portion 2b, and a tubular portion 2c.

The distal end portion 2a includes an illuminating system and an observing system, irradiates the object with illuminating light from the illuminating system, and picks up an image of return light from the object with the observing system.

The bending portion 2b is consecutively provided on a side of a proximal end of the distal end portion 2a and is configured to be capable of bending in, for example, two directions or in four directions of upward, downward, leftward, and rightward. When the bending portion 2b is bent, a direction of the distal end portion 2a changes and a direction of observation by the observing system and an irradiation direction of illuminating light by the illuminating system change. In addition, the bending portion 2b is also bent in order to improve insertability of the insertion portion 2 in the object.

The tubular portion 2c is a tubular part that couples a proximal end of the bending portion 2b and a distal end of the operation portion 3 to each other. The tubular portion 2c may have a rigid form in which the insertion portion 2 does not deflect or a flexible form in which the insertion portion 2 deflects in accordance with a shape of the object into which the insertion portion 2 is inserted. An endoscope in which the insertion portion has a rigid form is generally referred to as a rigid endoscope and an endoscope in which the insertion portion has a flexible form is generally referred to as a flexible endoscope. For example, a rigid endoscope and a flexible endoscope in the field of medicine are defined in ISO 8600-1:2015.

The operation portion 3 is a part which is consecutively provided on a side of the proximal end of the insertion portion 2 and which is grasped by a hand to perform various operations with respect to the endoscope 1. For example, the operation portion 3 includes a grasping portion 3a, a bending operation knob 3b, a plurality of operation buttons 3c, and a treatment instrument insertion opening 3d.

The grasping portion 3a is a part by which an operator grasps the endoscope 1 by a hand.

The bending operation knob 3b is an operation device for performing an operation of bending the bending portion 2b using, for example, a thumb of the hand grasping the grasping portion 3a.

For example, the plurality of operation buttons 3c include an air feeding/liquid feeding button, a suction button, and a button related to image pickup. The air feeding/liquid feeding button is a button for performing air feeding/liquid feeding to an observation window of the distal end portion 2a via an air feeding/liquid feeding channel (not illustrated) to perform an operation of cleaning the observation window. The suction button is a button for performing an operation of sucking a liquid, mucous membranes, or the like from inside the object via, for example, a treatment instrument channel that doubles as a suction channel. The button related to image pickup is, for example, a button switch for performing a release operation.

The treatment instrument insertion opening 3d is an opening on a side of the proximal end of the treatment instrument channel and is provided on, for example, a side surface on a side of a distal end of the grasping portion 3a. Various treatment instruments such as forceps are inserted into the treatment instrument channel via the treatment instrument insertion opening 3d. The distal end portion 2a is provided with an opening on a side of a distal end of the treatment instrument channel and a distal end of a treatment instrument protrudes from the opening to perform various kinds of treatment.

The universal cable 4 is extended from a side surface on a side of a proximal end of the operation portion 3 and is connected to an endoscope processor and a light source apparatus (both not illustrated) via a connector 4a.

Figure 2:
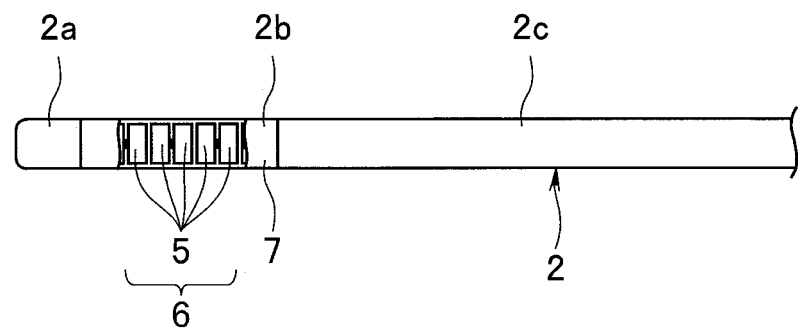
FIG. 2 is a partially broken view showing a situation where a plurality of joint rings are provided in a bending portion according to the first embodiment of the present disclosure.

FIG. 2 is a partially broken view showing a situation where a plurality of joint rings 5 are provided in the bending portion 2b according to the first embodiment.

The bending portion 2b includes a bending tube 6 configured by serially coupling the plurality of joint rings 5 so as to be rotatable and a flexible angle rubber 7 that covers an outer circumference of the bending tube 6. In addition, among the plurality of joint rings 5 that configure the bending tube 6 for endoscope, the joint ring 5 on a distalmost side is fixed to a side of the proximal end of the distal end portion 2a and the joint ring 5 on a proximal most side is fixed to a side of a distal end of the tubular portion 2c.

A distal end of an angle wire (hereinafter, referred to as a wire when appropriate) is fixed to the distal end portion 2a, and a side of a proximal end of a wire inserted through the insertion portion 2 is connected to a pulley that rotates in conjunction with the bending operation knob 3b provided in the operation portion 3. In addition, when the bending operation knob 3b is operated, the wire is pulled and the bending portion 2b bends, and a direction of the distal end portion 2a changes.

Figure 3:
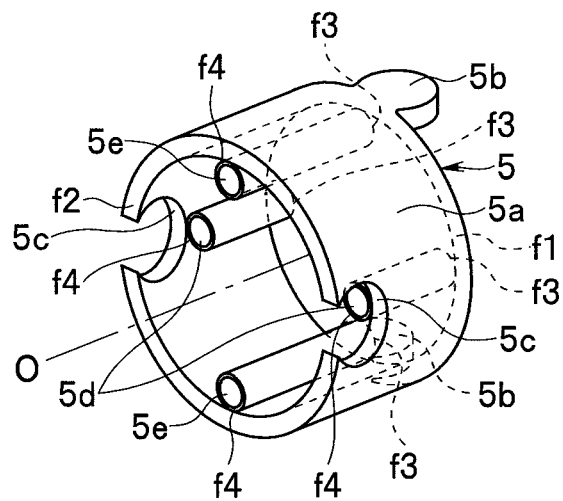
FIG. 3 is a perspective view showing an example of a joint ring that configures a bending tube capable of bending in four directions according to the first embodiment of the present disclosure.

FIG. 3 is a perspective view showing an example of the joint ring 5 that configures the bending tube 6 capable of bending in four directions according to the first embodiment.

The joint ring 5 includes a cylindrical joint ring body 5a that configures an external shape of the joint ring 5. The joint ring body 5a respectively includes a pair of hinge convex portions 5b (or first protrusion) on a first end surface f1 in a direction of a central axis O and a pair of hinge concave portions 5c (or first recess) on a second end surface f2 on an opposite side to the first end surface f1.

The joint ring body 5a includes a joint ring wall having an inner surface, an outer surface, a first end surface f1, and a second end surface f2. The first wire guide 5d is attached to the inner surface of the joint ring wall, the first wire guide 5d includes a first wire guide body including a first wire guide wall having a third end surface f3 and a fourth end surface f4. In a central axis direction of the joint ring body, at least a first portion of the first end surface f1 and at least a first portion of the third end surface f3 are at a first axial position and at least a first portion of the second end surface f2 and at least a first portion of the fourth end surface f4 are at a second axial position. A second wire guide 5e is attached to the inner surface of the joint ring wall, the second wire guide 5e includes a second wire guide body including a second wire guide wall having a fifth end f3 surface and a sixth end surface f4. In the central axis direction of the joint ring, at least a second portion of the first end surface f1 and at least a first portion of the fifth end surface f3 are at a third axial position, and at least a second portion of the second end surface f2 and at least a first portion of the sixth end surface f4 are at a fourth axial position. A length of the first wire guide 5d in the central axis direction between the third end surface and the fourth end surface defines a wire guide axial length, and the first wire guide 5d is attached to the inner surface of the joint ring wall along an entire wire guide axial length. A guide wire located in the first wire guide 5d of each of the plurality of joint rings 5, and a second guide wire located in the second wire guide 5e of each of the plurality of joint rings 5. The inner surface of the joint ring wall and the outer surface of the joint ring wall extend in a central axis direction of the joint ring and connect the first end surface f1 to the second end surface f2. The wire guide body includes a wire guide wall having an inner surface and an outer surface and the inner surface of the wire guide wall and the outer surface of the wire guide wall extend in a central axis direction of the joint ring body and connect the third end surface f3 to the fourth end surface f4.

Positions of the pair of hinge convex portions 5b around the central axis O differ from each other by 180 degrees and positions of the pair of hinge concave portions 5c around the central axis O differ from each other by 180 degrees. In addition, positions of the hinge convex portions 5b and the hinge concave portions 5c around the central axis O differ from each other by 90 degrees.

Another joint ring 5 that is arranged adjacent to the joint ring 5 on a side of the hinge convex portion 5b shown in FIG. 3 is provided with the hinge concave portion 5c (or first recess) at a position corresponding to the hinge convex portion 5b shown in FIG. 3. The hinge convex portion 5b of the joint ring 5 and the hinge concave portion 5c of the other joint ring 5 are fittingly joined to each other so as to be rotatable and the bending tube 6 bends in, for example, a left-right direction.

The second end surface f2 includes the first recess 5c extending in the central axis direction and the first end surface has a concave surface. The concave surface includes the first portion of the second end surface f2 at the first axial position. The first end surface f1 includes the first protrusion 5b extending in the central axis direction and having a convex surface, and the convex surface includes the second portion of the first end surface f1 at the fourth axial position. A length in the central axis direction between the first axial position and the second axial position defines a first axial length and a length in the central axis direction between the third axial position and the fourth axial position defines a second axial length. In the first axial length is shorter than the second axial length. The convex surface of the first protrusion 5b is conformal to the concave surface of the first recess 5c. The first protrusion 5b on the first of the plurality of joint rings 5 is located in the first recess 5c of the second of the plurality of joint rings 5, and the convex surface of the first protrusion 5b on the first of the plurality of joint rings 5 located in the concave surface of the first recess 5c of the second of the plurality of joint rings 5 forms a joint about which the first of the plurality of joint rings 5 pivots relative to the second of the plurality of joint rings 5.

In addition, further another joint ring 5 that is arranged adjacent to the joint ring 5 on a side of the hinge concave portion 5c shown in FIG. 3 is provided with the hinge convex portion 5b at a position corresponding to the hinge concave portion 5c shown in FIG. 3. The hinge concave portion 5c of the joint ring 5 and the hinge convex portion 5b of the further other joint ring 5 are fittingly joined to each other so as to be rotatable and the bending tube 6 bends in, for example, an up-down direction.

An angle wire pertaining to bending in the left-right direction and an angle wire pertaining to bending in the up-down direction are inserted through the joint rings 5 of the bending tube 6 that is capable of bending in, for example, four directions. Correspondingly, a pair of wire guides 5d and a pair of wire guides 5e are bonded to an inner circumferential side of the joint ring body 5a. The pair of wire guides 5d are guide members that guide, for example, the angle wire pertaining to bending in the left-right direction. The pair of wire guides 5e are guide members that guide, for example, the angle wire pertaining to bending in the up-down direction.

The wire guides 5d and 5e respectively have a third end surface f3 and a fourth end surface f4. In the joint ring 5, the first end surface f1 and the third end surface f3 are at a same position and the second end surface f2 and the fourth end surface f4 are at a same position in the direction of the central axis O of the joint ring body 5a. As will be described later, such a structure is obtained by cutting the first end surface f1 and the third end surface f3 at a same plane and cutting the second end surface f2 and the fourth end surface f4 at another same plane.

Figure 4:
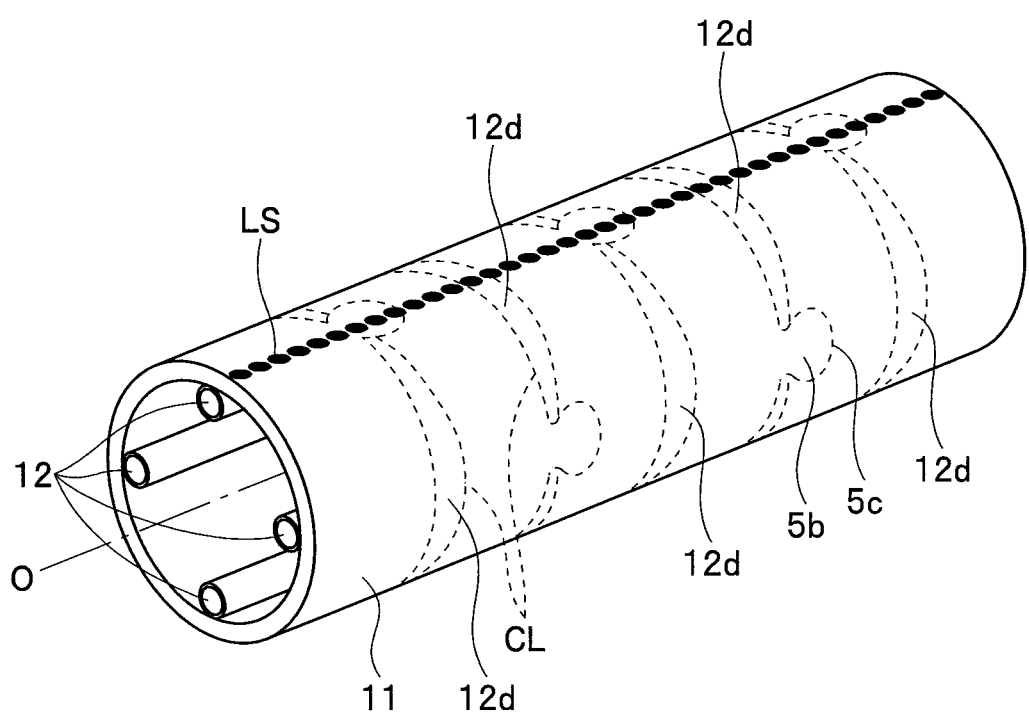
FIG. 4 is a perspective view of a joint ring base material to which a wire guide base material is bonded for explaining a manufacturing method of a bending tube including a plurality of joint rings according to the first embodiment of the present disclosure.
Figure 5:
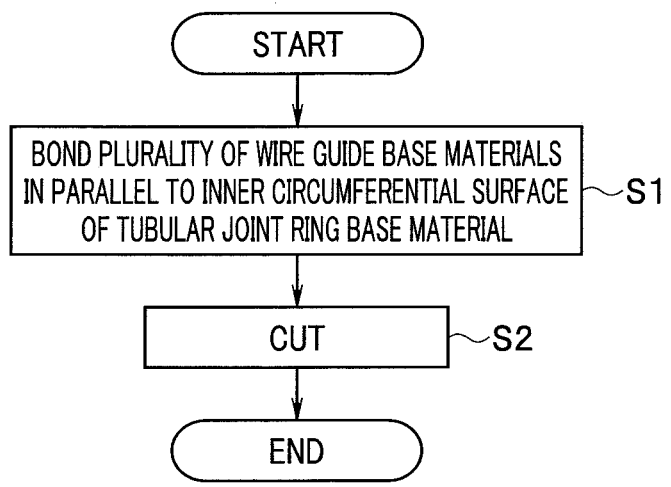
FIG. 5 is a flow chart for explaining a manufacturing method of a bending tube including a plurality of joint rings according to the first embodiment of the present disclosure.

FIG. 4 is a perspective view of a joint ring base material 11 to which a wire guide base material 12 is bonded for explaining a manufacturing method of the bending tube 6 including the plurality of joint rings 5 according to the first embodiment. FIG. 5 is a flow chart for explaining the manufacturing method of the bending tube 6 including a plurality of joint rings 5 according to the first embodiment.

The joint ring base material 11 is a material to become a basis of manufacturing a plurality of the joint ring bodies 5a and is formed in a long tubular shape. While an example where the joint ring base material 11 is formed in a circular tube shape will be described hereinafter, the joint ring base material 11 is not limited to a circular tube shape. In addition, while an example of a joint ring base material 11 for manufacturing six joint ring bodies 5a is shown in FIG. 4, obviously, the joint ring base material 11 for manufacturing two to five or seven or more joint ring bodies 5a may be used.

The wire guide base material 12 is a material to become a basis of manufacturing pluralities of the wire guides 5d and 5e in the plurality of joint rings 5. The wire guide base material 12 is formed long in a same length as the joint ring base material 11. FIG. 4 shows an example in which the wire guide base material 12 has a circular tube shape, and an interior with a circular tube shape of the wire guide base material 12 configures concave portions that are successive in a longitudinal direction. As will be described later, the wire guide base material 12 is not limited to a circular tube shape and may not even be a tubular shape. The wire guide base material 12 can need only have concave portions that are successive in the longitudinal direction and the succession of concave portions may be a continuous succession (for example, refer to FIG. 9) or an intermittent succession (for example, refer to FIG. 10).

When the manufacturing method of the bending tube 6 shown in FIG. 5 is started, four wire guide base materials 12 are respectively positioned and bonded so as to be parallel to the central axis O of the joint ring base material 11 with a circular tube shape at, for example, positions angularly shifted by 90 degrees each around the central axis O of an inner circumference of the joint ring base material 11 (step S1).

In a bonding process, first, the wire guide base material 12 is positioned and fixed to the joint ring base material 11 using a tool which, for example, holds in four directions and restricts rotation at two locations. Then, by performing laser welding from outside of the joint ring base material 11, the wire guide base material 12 is bonded to the joint ring base material 11. In FIG. 4, laser-welded portions LS are indicated by a row of dots. Note that bonding is not limited to laser welding and the wire guide base material 12 may be bonded to the joint ring base material 11 by spot welding, brazing, or the like.

While four wire guide base materials 12 are bonded to positions shifted by 90 degrees each around the central axis O since FIG. 4 shows an example of the bending tube 6 that is capable of bending in four directions of upward, downward, leftward, and rightward, in a case of the bending tube 6 that is capable of bending in two directions, two wire guide base materials 12 may be bonded to positions shifted by 180 degrees each around the central axis O.

Next, the joint ring base material 11 to which, for example, four wire guide base materials 12 are bonded is cut along cut lines CL depicted by dotted lines in FIG. 4 (step S2). Cutting is performed by laser machining in which at least one of output, number of scans, and a focal position is varied. Alternatively, the cutting process may be performed by a processing method that combines cutting due to dicing and laser machining.

By cutting along the cut lines CL shown in FIG. 4, adjacent joint rings 5 remain coupled to each other in a state where the hinge convex portion 5b and the hinge concave portion 5c are fittingly joined to each other so as to be rotatable and, at the same time, a fall-off part 12d falls off to form a gap that enables adjacent joint rings 5 to bend without abutting against each other.

In this case, the first end surface f1 and the second end surface f2 of the joint ring body 5a and the third end surface f3 and the fourth end surface f4 of the wire guides 5d and 5e become cut surfaces. In addition, positions in the direction of the central axis O of the first end surface f1 and the third end surface f3 are the same since the first end surface f1 and the third end surface f3 are formed by a common cut surface, and positions in the direction of the central axis O of the second end surface f2 and the fourth end surface f4 are the same since the second end surface f2 and the fourth end surface f4 are formed by a common cut surface.

In this manner, the bending tube 6 in a state where the plurality of joint rings 5 are coupled to be capable of bending is manufactured.

While processes of manufacturing the bending tube 6 in a state where the plurality of joint rings 5 are combined with each other (a manufacturing method of the bending tube 6 for endoscope) has been described above, the cut lines CL may be changed to create processes of individually manufacturing the plurality of joint rings 5 which are not in a combined state and which are separated from each other by the cut lines CL (a manufacturing method of the joint ring 5).

Figure 6:
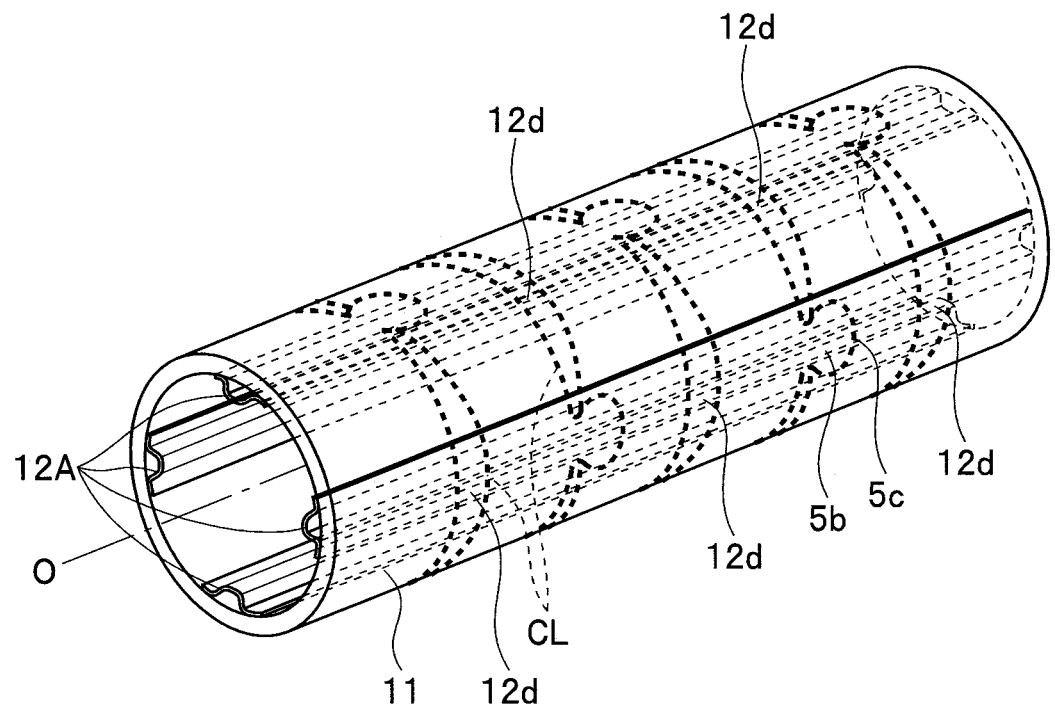
FIG. 6 is a diagram showing a joint ring base material to which a wire guide base material of a first modification is bonded according to the first embodiment of the present disclosure.
Figure 7:
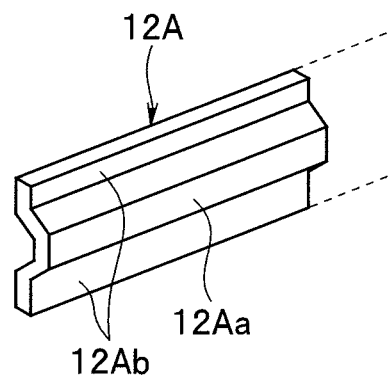
FIG. 7 is a perspective view showing an enlargement of a configuration of the wire guide base material of the first modification according to the first embodiment of the present disclosure.

FIG. 6 is a diagram showing the joint ring base material 11 to which a wire guide base material 12A of a first modification is bonded according to the first embodiment. FIG. 7 is a perspective view showing an enlargement of a configuration of the wire guide base material 12A of the first modification according to the first embodiment.

While a material with a circular tube shape is used as the wire guide base material 12 in the example shown in FIG. 4, the wire guide base material 12A shown in FIG. 6 and FIG. 7 has a shape in which a cross section perpendicular to a longitudinal direction includes a trapezoid without a lower base and both leg portions extending toward both outer sides from a side of the lower base of the trapezoid without a lower base. A portion of the trapezoid without a lower base configures a wire housing portion 12Aa and both leg portions configure a bonded portion 12Ab to be bonded to the joint ring base material 11. A face of the wire housing portion 12Aa on a side opposing the joint ring base material 11 configures concave portions that are successive in a longitudinal direction of the wire guide base material 12A. Since the bonded portion 12Ab is to be bonded to the inner circumferential surface of the joint ring base material 11, a cross-sectional shape perpendicular to the longitudinal direction is an arc shape that conforms to the inner circumferential surface of the joint ring base material 11.

The wire guide base material 12A with such a shape can be formed by, for example, sheet-metal working. Using sheet-metal working in this manner enables a degree of freedom of the shape of the wire guide base material to be further increased.

As shown in FIG. 6, the wire guide base material 12A is used instead of the wire guide base material 12 shown in FIG. 4 and the bonded portion 12Ab is bonded to the joint ring base material 11 so that a wire can be housed between the wire housing portion 12Aa and the inner circumferential surface of the joint ring base material 11. In a similar manner to the bonding method described earlier, laser welding, spot welding, brazing, or the like can be used as the bonding method.

In addition, using the wire guide base material 12A increases a contact area with the joint ring base material 11 as compared to the wire guide base material 12 with a circular tube shape and increases bonding strength between the joint ring base material 11 and the wire guide base material 12A. Accordingly, strength of the joint rings 5 after manufacture increases and, by extension, strength of the bending tube 6 itself also increases.

Furthermore, since the wire guide base material 12A has a shape in which a cross section perpendicular to the longitudinal direction does not have a lower base, compared to the wire guide base material 12 with a circular tube shape or a D-shaped wire guide base material 12B (refer to FIG. 9 and the like) to be described later, a height of protrusion from the inner circumferential surface of the joint ring base material 11 can be reduced and a space inside the bending tube 6 can be utilized more effectively.

Figure 8:
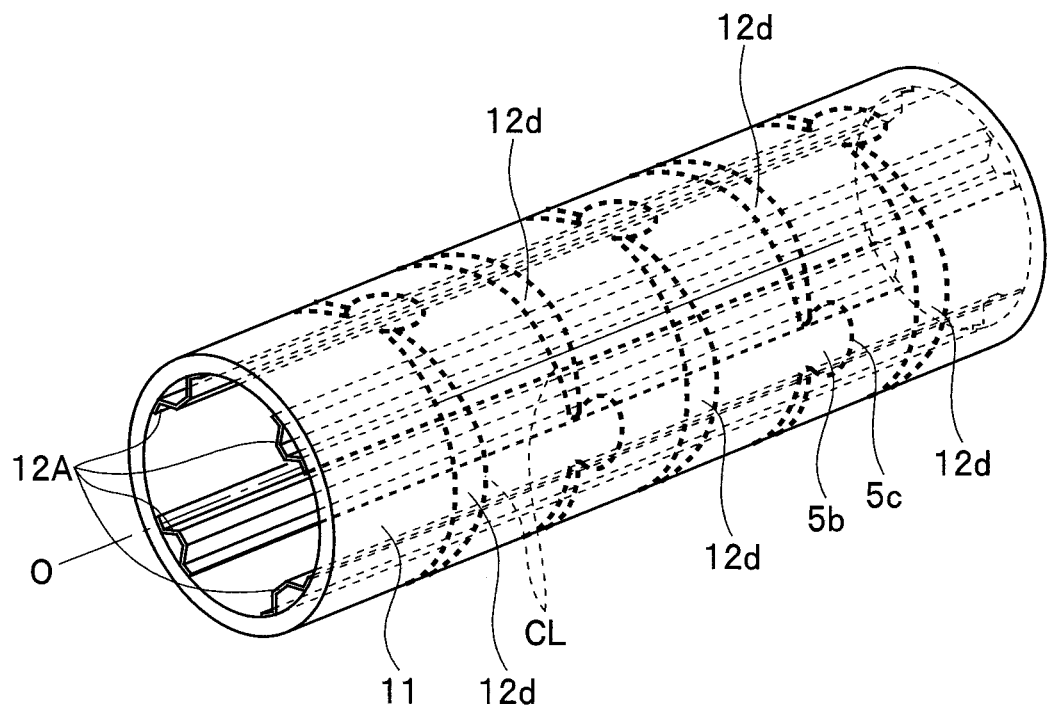
FIG. 8 is a diagram showing another configuration example of a joint ring base material to which the wire guide base material of the first modification is bonded according to the first embodiment of the present disclosure.

FIG. 8 is a diagram showing another configuration example of the joint ring base material 11 to which the wire guide base material 12A of the first modification is bonded according to the first embodiment.

In the example shown in FIG. 6, the wire guide base material 12A is bonded to positions on an inner circumferential side of the hinge convex portion 5b and the hinge concave portion 5c. By comparison, in the example shown in FIG. 8, the wire guide base material 12A is bonded to positions that are shifted by, for example, 45 degrees around the central axis O from positions on the inner circumferential side of the hinge convex portion 5b and the hinge concave portion 5c.

When the joint ring base material 11 to which the wire guide base material 12A has been bonded is cut by laser machining from an outer circumferential side, since a thickness of the wire guide base material 12A in a direction of laser irradiation varies, it is difficult to stabilize cutting performance. Supposing that a failure to stabilize cutting performance makes cross-sectional shapes of the hinge convex portion 5b and the hinge concave portion 5c uneven, a variation may occur between a bending state of two joint rings 5 at a given coupling position and a bending state of two joint rings 5 at another coupling position.

By comparison, by adopting the configuration shown in FIG. 8, since only a thickness of the joint ring base material 11 can need be cut by laser machining at portions where the hinge convex portion 5b and the hinge concave portion 5c are created, cutting performance can be readily stabilized. Accordingly, a variation in bending states according to coupling positions can be suppressed and the bending state can be made constant at any coupling position.

In addition, since the wire guide base material 12A is bonded at a position where the fall-off part 12d is formed, even if cutting performance is not stabilized and a cross-sectional shape becomes uneven, bending performance is not affected.

Figure 9:
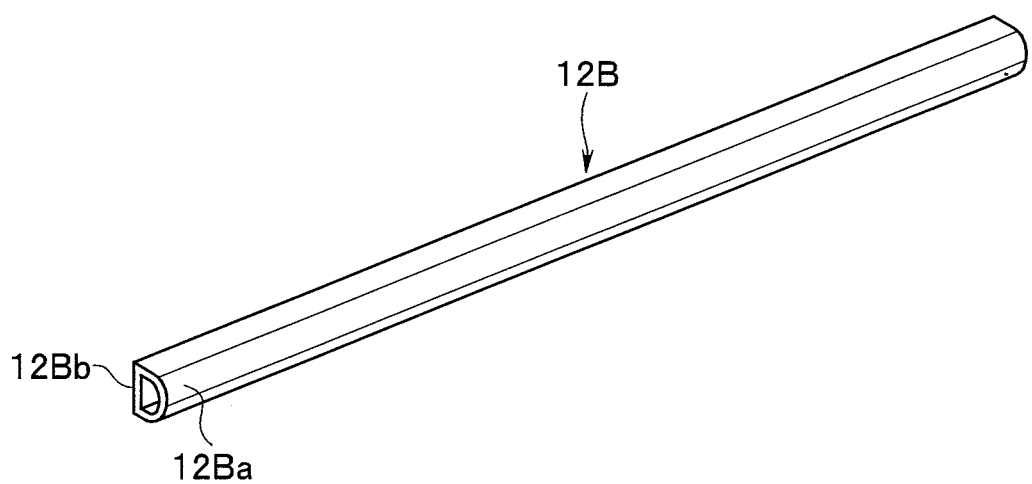
FIG. 9 is a perspective view showing a configuration of a wire guide base material of a second modification according to the first embodiment of the present disclosure.

FIG. 9 is a perspective view showing a configuration of a wire guide base material 12B of a second modification according to the first embodiment.

The wire guide base material 12B is a tubular material (a tubular body) whose cross section perpendicular to a longitudinal direction forms a D-shape (or, when a part of a circle is cut away by a chord, a cross-sectional shape made up of an arc and the chord). The wire guide base material 12B is made up of a protruding-shape portion 12Ba that is an arc portion and an approximately-straight portion 12Bb that is a chord portion of the D-shaped cross section. The approximately-straight portion 12Bb may include a plate. The approximately-straight portion 12Bb is a portion to be bonded to the inner circumferential surface of the joint ring base material 11 and a cross-sectional shape is formed in an arc shape that conforms to the inner circumferential surface of the joint ring base material 11 in order to increase adhesion during bonding.

Using the wire guide base material 12B increases a contact area with the joint ring base material 11 as compared to the wire guide base material 12 with a circular tube shape and increases bonding strength between the joint ring base material 11 and the wire guide base material 12B. Accordingly, strength of the joint rings 5 after manufacture increases and, by extension, strength of the bending tube 6 itself also increases.

Figure 10:
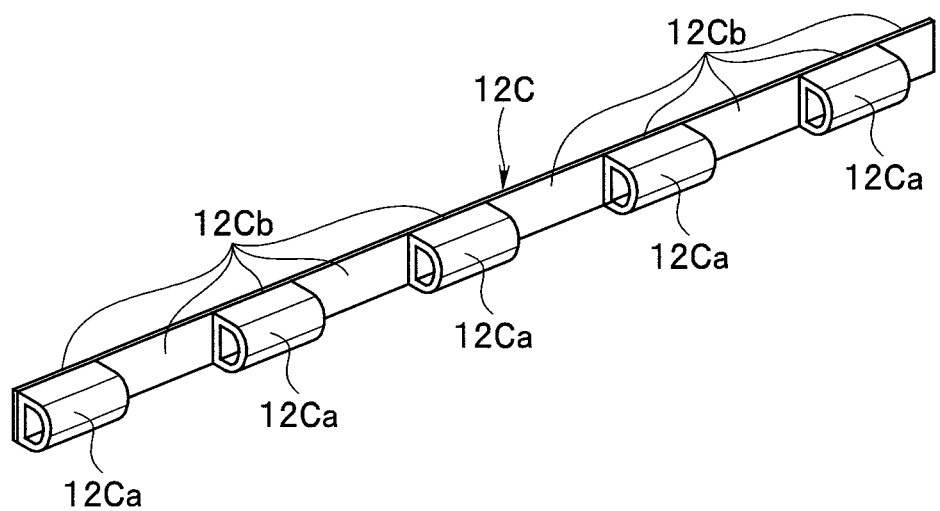
FIG. 10 is a perspective view showing a configuration of a wire guide base material of a third modification according to the first embodiment of the present disclosure.

FIG. 10 is a perspective view showing a configuration of a wire guide base material 12C of a third modification according to the first embodiment.

The wire guide base material 12C is a material in which protruding-shape portions 12Ca (or tubular bodies) are intermittently formed at a plurality of locations in a longitudinal direction with respect to an approximately-straight portion 12Cb (or plate-like body) whose a cross section perpendicular to a longitudinal direction is an approximately-straight shape. A portion only made of the approximately-straight portion 12Cb is a plate-like body with an approximately flat plate-shape and a portion provided with the approximately-straight portion 12Cb and the protruding-shape portion 12Ca is a tubular body whose cross section perpendicular to a longitudinal direction forms a D-shape. Concave portions that are successive in a longitudinal direction of the wire guide base material 12C are formed on an inner surface of the tubular body.

As described above, the wire guide base material 12C has a structure in which a plate-like body and a tubular body are alternately formed in the longitudinal direction. In addition, the approximately-straight portion 12Cb is a portion to be bonded to the inner circumferential surface of the joint ring base material 11 and a cross-sectional shape is formed in an arc shape that conforms to the inner circumferential surface of the joint ring base material 11 in order to increase adhesion during bonding.

The wire guide base material 12C as shown in FIG. 10 is formed by, for example, intermittently cutting the tubular wire guide base material 12B as shown in FIG. 9 while leaving the approximately-straight portion 12Bb (the approximately-straight portion 12Cb) that opposes the inner circumferential surface of the joint ring base material 11 intact. The wire guide base material 12C includes the plate-like body 12Cb and the plurality of tubular bodies 12Ca formed on the plate-like body 12Cb, cutting the tubular joint ring base material 11A includes cutting the plate-like body 12Cb bonded to the joint ring base material 11A. Manufacturing the wire guide base material 12C, manufacturing the wire guide base material 12C includes bonding the plate-like body 12Cb and the tubular body base material 12Ca intermittently.

The plate-like body is provided at a location where the cut line CL passes and the tubular body is provided at a location where the cut line CL does not pass. Therefore, the joint ring base material 11 to which the wire guide base material 12C is bonded is cut in a portion of the plate-like body but not cut in a portion of the tubular body.

Accordingly, when the joint ring base material 11 to which the wire guide base material 12C has been bonded is cut by laser machining from an outer circumference, since a thickness on the cut line CL when passing the plate-like body does not change, cutting performance is stabilized and an even cross-sectional shape is obtained. Accordingly, a variation in bending states at coupling positions can be suppressed and the bending state can be made constant at any coupling position.

According to the first embodiment described above, since the joint ring base material 11 and the wire guide base materials 12, 12A, 12B, and 12C are collectively cut at common cut lines CL after bonding the joint ring base material 11 and the wire guide base materials 12, 12A, 12B, and 12C to each other, there is no need to individually bond the plurality of wire guides 5d and 5e to each joint ring body 5a and a plurality of joint rings 5 can be manufactured at high efficiency and low cost. In addition, since no variations occur in mounting positions of the wire guides 5d and 5e among the plurality of joint rings 5, joint rings 5 to which the wire guides 5d and 5e are mounted with high positioning accuracy are obtained.

Since the joint ring base material 11 and the wire guide base materials 12, 12A, 12B, and 12C prior to cutting are larger than the joint ring body 5a and the wire guides 5d and 5e after cutting, positioning during machining and bonding work can be readily performed.

In addition, since lengths of the joint ring base material 11 and the wire guide base materials 12, 12A, 12B, and 12C are made equal, positioning among the joint ring base material 11 and the wire guide base materials 12, 12A, 12B, and 12C can be readily performed.

Furthermore, since cutting along the cut lines CL enables the bending tube 6 to be generated in which the plurality of joint rings 5 are coupled to each other by the hinge convex portion 5b and the hinge concave portion 5c. Accordingly, the bending tube 6 including the plurality of joint rings 5 can be manufactured at high efficiency and low cost.

Second Embodiment

Figure 11:
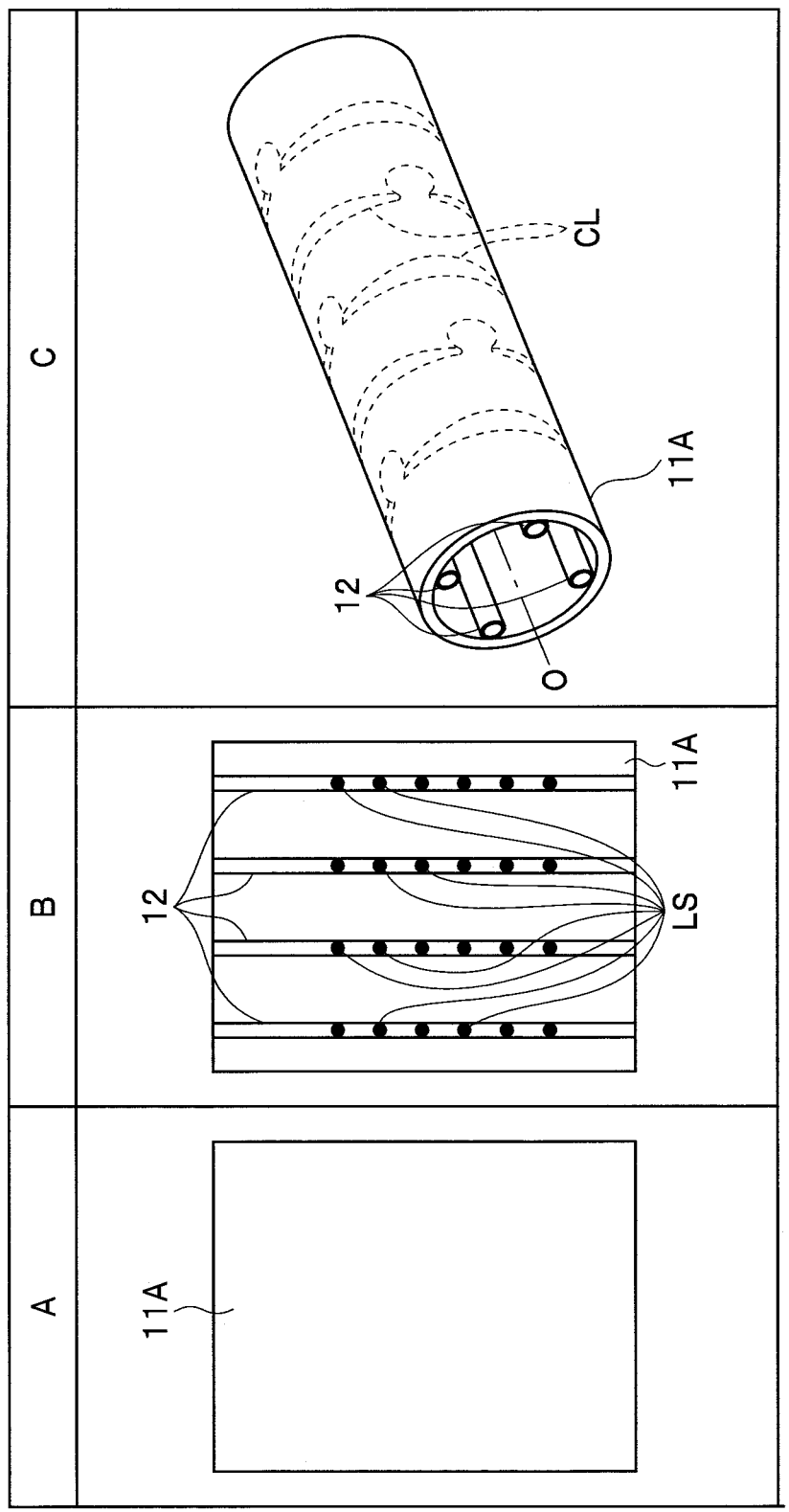
FIG. 11 is a chart for explaining a manufacturing method of a bending tube according to a second embodiment of the present disclosure.
Figure 12:
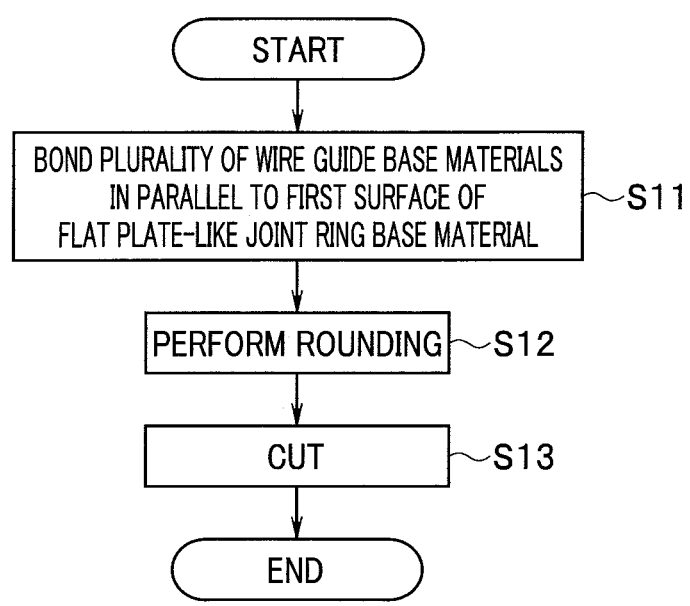
FIG. 12 is a flow chart for explaining the manufacturing method of a bending tube according to the second embodiment of the present disclosure.

FIGS. 11 to 15 represent a second embodiment of the present disclosure, in which FIG. 11 is a chart for explaining a manufacturing method of the bending tube 6 according to the second embodiment. FIG. 12 is a flow chart for explaining a manufacturing method of the bending tube 6 according to the second embodiment. In the second embodiment, portions similar to the first embodiment will be denoted by same reference signs and descriptions of such portions will be omitted as appropriate, and differences will be mainly described. The method of manufacturing a joint ring 5, comprises attaching a plurality of wire guide base material 12 to a joint ring base material 11A (S11) with the plurality of wire guide base material 12 attached to the joint ring base material 11A, forming a tubular joint ring base material 11A, cutting the tubular joint ring base material 11A to manufacture the joint ring (S13) to manufacture one or more of joint rings 5. In the tubular joint ring base material 11A, each of the plurality of wire guide base material 12 extends along a central axis of the tubular joint ring base material 11A and each of the plurality of wire guide base material 12 is spaced apart in a circumferential direction on an inner surface of the tubular joint ring base material 11A. The cutting the tubular joint ring base material 11A includes forming the hinge coupling 5b between the first joint ring 5 and the second joint ring 5, and forming a space between the first joint ring 5 and the second joint ring 5 in a central axis direction of the bending tube. The hinge coupling 5b includes the first recess 5c on a second end surface f2 of the first joint ring 5, the first recess 5c extends in the central axis direction and has a concave surface. The first protrusion 5b on a first end surface f1 of the second joint ring, the first protrusion 5b extending in the central axis direction and having a convex surface. In the joint ring, each of the plurality of wire guide base material 12 defines one of a plurality of wire guides 5e or 5d, and a length of the joint ring 5 in a central axis direction and a length of at least a portion of the plurality of wire guides 5d or 5e are equal. A shape of the tubular joint ring base material 11A is a right cylinder.

The joint ring base material 11A is a material to become a basis of manufacturing a plurality of the joint ring bodies 5a and is formed in a rectangular flat plate shape as shown in a field A in FIG. 11. A first one of the plurality of wire guide base material 12 defines a first wire guide 5d and a second one of the plurality of wire guide base material 12 defines a second wire guide 5e. In a central axis direction of the joint ring 5, the first wire guide 5d is longer than a second wire guide 5e. In the step of attaching the plurality of wire guide base material 12 to the joint ring base material 11, the joint ring base material 11 is a flat plate including side surfaces, and a first surface to which the plurality of wire guide base material 12 are attached.

When the manufacturing method of the bending tube 6 shown in FIG. 12 is started, as shown in a field B in FIG. 11, with respect to a first surface being one of two principal surfaces of the rectangular joint ring base material 11A, for example, four (when manufacturing the bending tube 6 capable of bending in four directions) wire guide base materials 12 with circular tube shapes are positioned and bonded so that each wire guide base material 12 becomes parallel to, for example, a long side (while the long side is used as an example, there may be cases where a short side may be parallel; hereinafter, the same description applies) of the joint ring base material 11A and, at the same time, adjacent wire guide base materials 12 are arranged at regular intervals (step S11).

In this case, a length of the long side of the joint ring base material 11A and a length of the wire guide base material 12 are equal. In addition, an interval between the wire guide base materials 12 at both ends and the long side of the joint ring base material 11A is, for example, half of an interval between adjacent wire guide base materials 12 (however, the interval need not be half when a sum of an interval between the wire guide base material 12 at a left end and a long side at a left end and an interval between the wire guide base material 12 at a right end and a long side at a right end is equal to the interval between adjacent wire guide base materials 12).

In the field B in FIG. 11, laser-welded portions LS are indicated by a row of dots. In a similar manner to the bonding method described earlier, laser welding, spot welding, brazing, or the like can be used as the bonding method.

Subsequently, the joint ring base material 11A to which the wire guide base materials 12 have been bonded is rounded around the central axis O with the first surface to which the four wire guide base materials 12 with the circular tube shape have been bonded on an inner side so that the short side of the joint ring base material 11A becomes a circle, and creates a circular tube shape as shown in a field C in FIG. 11 (step S12).

A subsequent cutting process (step S13) is similar to the cutting process described in step S2 in FIG. 5 according to the first embodiment.

Figure 13:
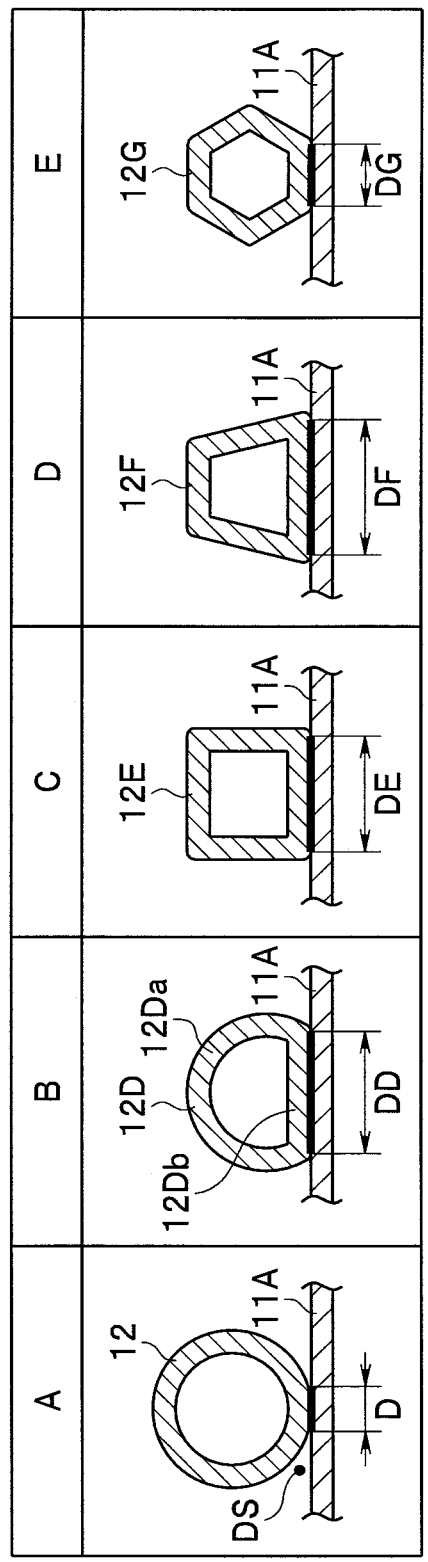
FIG. 13 is a diagram showing an example of a shape of a cross section perpendicular to a longitudinal direction of a wire guide base material according to the second embodiment of the present disclosure.

FIG. 13 is a diagram showing an example of a shape of a cross section perpendicular to a longitudinal direction of a wire guide base material according to the second embodiment.

A field A in FIG. 13 shows a cross-sectional shape when the wire guide base material 12 with a circular tube shape shown in the field C in FIG. 11 is bonded to the joint ring base material 11A. The wire guide base material 12 is bonded to the joint ring base material 11A in a range of a width D.

A wire guide base material 12D shown in a field B in FIG. 13 has a tubular shape whose cross section forms a D-shape and is made up of a protruding-shape portion 12Da and a straight portion 12Db. While the wire guide base material 12D is similar to the wire guide base material 12B shown in FIG. 9, an angular range of an arc of the protruding-shape portion 12Da is formed larger than an angular range of an arc of the protruding-shape portion 12Ba of the wire guide base material 12B and the wire guide base material 12D has a rounder shape.

In addition, since the wire guide base material 12B is bonded to an inner circumferential surface of the joint ring base material 11 with a circular tube shape, the cross section of the approximately-straight portion 12Bb is given an arc shape. By comparison, since the wire guide base material 12D is bonded to a first surface of the wire guide base material 12A with a flat plate shape, the straight portion 12Db has a straight cross section. Furthermore, the wire guide base material 12D is bonded to the joint ring base material 11A in a range of a width DD. The width DD is a length of a chord in a D-shaped cross section made up of an arc and the chord.

A wire guide base material 12E shown in a field C in FIG. 13 has a tubular shape whose cross section is a rectangular shape (for example, a square). The wire guide base material 12E is bonded to the joint ring base material 11A in a range of a width DE. For example, the width DE is a length of one side of the square.

A wire guide base material 12F shown in a field D in FIG. 13 has a tubular shape whose cross section forms an isosceles trapezoid. The wire guide base material 12F is bonded to the joint ring base material 11A by a longer base in a range of a width DF. The width DF is a length of a longer base of the isosceles trapezoid.

A wire guide base material 12G shown in a field E in FIG. 13 has a tubular shape whose cross section forms a hexagon (for example, a regular hexagon). The wire guide base material 12G is bonded to the joint ring base material 11A in a range in which one side is a width DG. The width DG is, for example, a length of one side of the regular hexagon.

If cross-sectional areas of intratubular spaces of the wire guide base materials 12, 12D, 12E, 12F, and 12G are the same, the widths DD, DE, DF, and DG are all larger than the width D. Therefore, with the wire guide base materials 12D, 12E, 12F, and 12G, a contact area with the joint ring base material 11A becomes larger than in the case of the wire guide base material 12 and bonding strength can be increased.

In addition, as shown in the field A in FIG. 13, a dead space DS in which arranging another member or the like is difficult is created between the wire guide base material 12 with a circular tube shape and the joint ring base material 11A. By comparison, since the dead space DS is not created by the wire guide base materials 12D, 12E, and 12F, an internal space of the bending tube 6 can be utilized more effectively.

Which of the wire guide base materials 12, 12D, 12E, 12F, and 12G with the various cross-sectional shapes shown in FIG. 13 is used may be appropriately selected in accordance with a layout of a member to be inserted into the bending tube 6 or the like.

Note that the wire guide base materials of the various cross-sectional shapes shown in FIG. 13 may be applied to other embodiments. In addition, a configuration of a wire guide base material in which a tubular body and a plate-like body are alternately provided as shown in FIG. 10 in the first embodiment may be applied to the wire guide base materials with the various cross-sectional shapes according to the present embodiment or applied to other embodiments.

Figure 14:
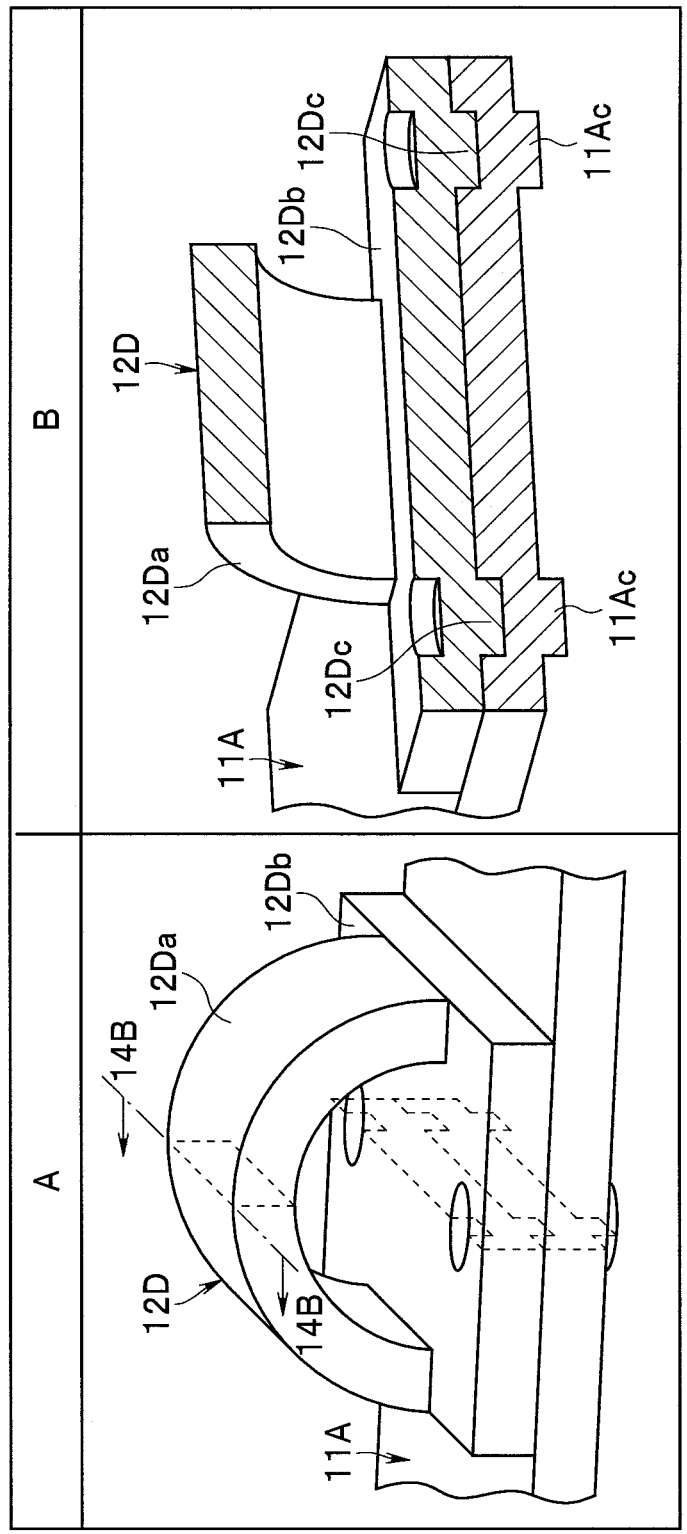
FIG. 14 is a chart for explaining an example of performing bonding of a wire guide base material to a joint ring base material by permanent bonding due to pressing according to the second embodiment of the present disclosure.

FIG. 14 is a chart for explaining an example of performing bonding of the wire guide base material 12D to the joint ring base material 11A by permanent bonding due to pressing according to the second embodiment.

FIG. 14 shows an example of bonding, to the joint ring base material 11A, the wire guide base material 12D which has a cross-sectional shape such as the cross-sectional shape shown in the field B in FIG. 13 and in which a tubular body and a plate-like body are alternatively provided as shown in FIG. 10.

A field A in FIG. 14 shows a perspective view and a field B in FIG. 14 shows a perspective view when the wire guide base material 12D and the joint ring base material 11A are cut along a 14B-14B cross section in the field A.

By positioning the wire guide base material 12D with respect to the joint ring base material 11A and permanently bonding the wire guide base material 12D to the joint ring base material 11A by pressing, for example, a boss 12Dc that is press-fitted into the joint ring base material 11A from the straight portion 12Db of the wire guide base material 12D is formed and a boss 11Ac protrudes downward from a lower surface on an opposite side to the boss 12Dc in the joint ring base material 11A.

In addition, since cutting into individual joint rings 5 can also be performed during pressing, production efficiency improves.

Figure 15:
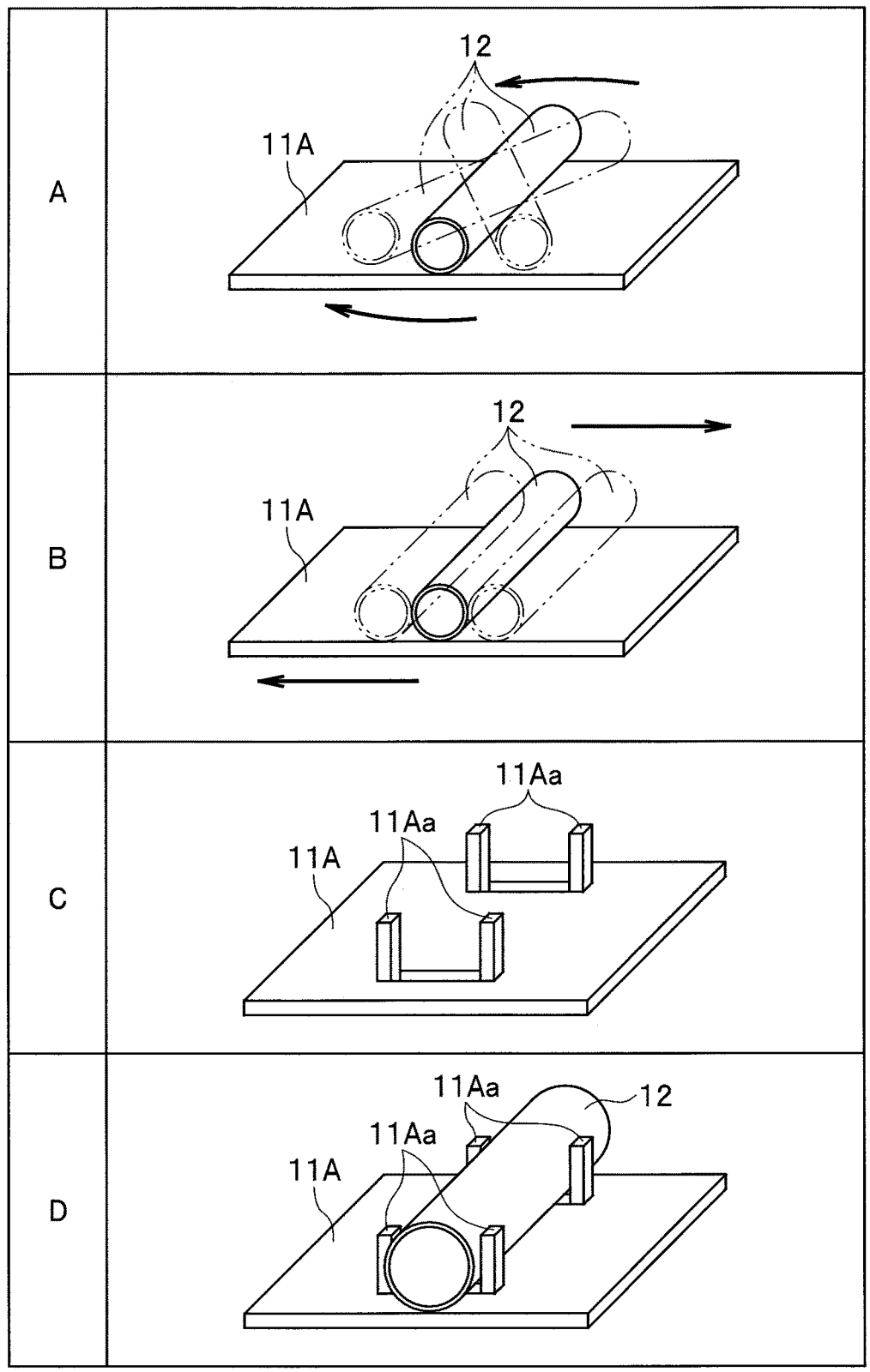
FIG. 15 is a chart for explaining a configuration in which a wire guide base material is readily positioned with respect to a joint ring base material according to the second embodiment of the present disclosure.

FIG. 15 is a chart for explaining a configuration in which the wire guide base material 12 is readily positioned with respect to the joint ring base material 11A according to the second embodiment.

When the wire guide base material 12 with a circular tube shape is placed on the joint ring base material 11A with a flat plate shape, the wire guide base material 12 may move by rolling.

A field A in FIG. 15 shows an example in which the wire guide base material 12 placed on top of the joint ring base material 11A rotates around an axis perpendicular to a principal surface of the joint ring base material 11A.

A field B in FIG. 15 shows an example in which the wire guide base material 12 placed on top of the joint ring base material 11A moves by rolling along the principal surface of the joint ring base material 11A.

Therefore, as shown in a field C in FIG. 15, the joint ring base material 11A is subjected to cutting due to laser machining and bending to form a positioning shape portion 11Aa for sandwiching, for example, the wire guide base material 12.

Specifically, for example, by making an H-shaped incision in the joint ring base material 11A by laser machining and performing bending, the positioning shape portion 11Aa is formed in which two columnar portions are erected across a rectangular hole. In the illustrated example, two sets of positioning shape portions 11Aa are formed in a direction of a long side of the joint ring base material 11A (a direction corresponding to the longitudinal direction of the wire guide base material 12).

Accordingly, as shown in a field D in FIG. 15, the wire guide base material 12 can be positioned with respect to the joint ring base material 11A without using a separate tool and a bonding process can be performed in a positioned state.

According to the second embodiment described above, a substantially similar effect to the first embodiment described earlier can be produced and, at the same time, the use of the joint ring base material 11A with a flat plate shape makes bonding work of the wire guide base material 12 to the joint ring base material 11A easier.

Third Embodiment

Figure 16:
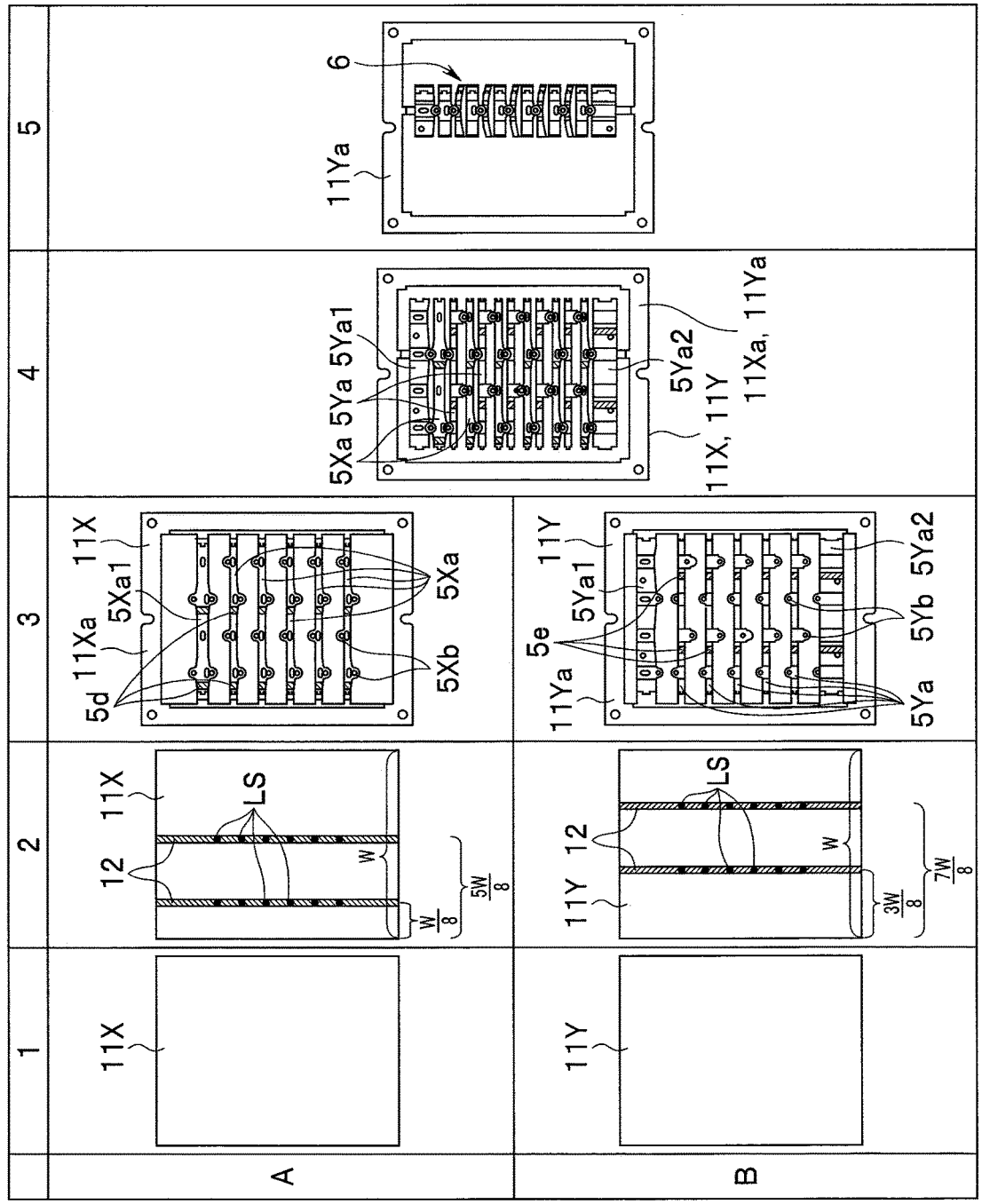
FIG. 16 is a chart for explaining a manufacturing method of a bending tube according to a third embodiment of the present disclosure.
Figure 17:
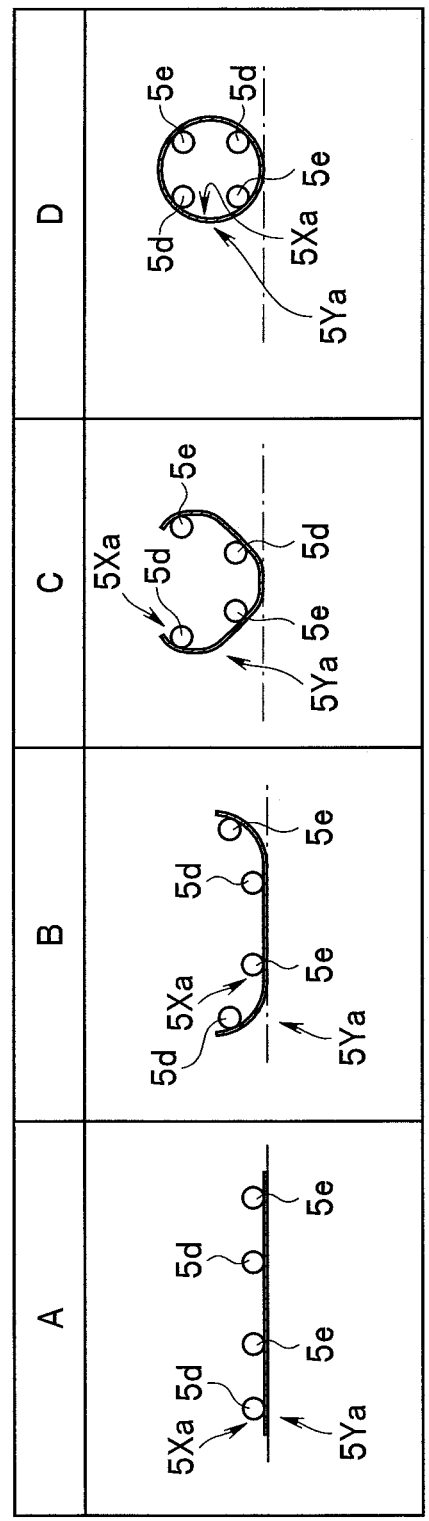
FIG. 17 is a chart for explaining a process of rounding according to the third embodiment of the present disclosure.

FIGS. 16 to 18 represent a third embodiment of the present disclosure, in which FIG. 16 is a chart for explaining a manufacturing method of the bending tube 6 according to the third embodiment. In the third embodiment, portions similar to the first and second embodiments will be denoted by same reference signs and descriptions of such portions will be omitted as appropriate, and differences will be mainly described. Even in the present embodiment, an example of manufacturing the bending tube 6 capable of bending in four directions will be described. In the step of attaching the plurality of wire guide base material 12 to the joint ring base material 11X and 11Y, the joint ring base material 11X and 11Y is a flat plate including side surfaces, and a first surface to which the plurality of wire guide base material 12 are attached.

In the present embodiment, the bending tube 6 that combines joint rings of two types is manufactured using two pieces of joint ring base materials 11X and 11Y.

The joint ring base material 11X is a material to become a basis of manufacturing a plurality of joint ring main bodies 5Xa and is formed in a rectangular flat plate shape as shown in a field A1 in FIG. 16.

The joint ring base material 11Y is a material to become a basis of manufacturing a plurality of joint ring main bodies 5Ya and is formed in a rectangular flat plate shape as shown in a field B1 in FIG. 16. The joint ring base material 11Y has a same shape and a same size as the joint ring base material 11X.

FIG. 18 is a flow chart for explaining a manufacturing method of the bending tube 6 according to the third embodiment.

When the manufacturing method of the bending tube 6 shown in FIG. 18 is started, as shown in a field A2 in FIG. 16, with respect to a first surface being one of two principal surfaces of the rectangular joint ring base material 11X, for example, two wire guide base materials 12 with circular tube shapes are arranged so that each wire guide base material 12 becomes parallel to a long side of the joint ring base material 11X (and, therefore, parallel to each other). In this case, a length of the long side of the joint ring base material 11X and a length of the wire guide base material 12 are equal.

The arrangement is performed based on positioning carried out as follows. When a length of a short side of the joint ring base material 11X is denoted by W, a first wire guide base material 12 is positioned and arranged at a position expressed as (W/8) and a second wire guide base material 12 is positioned and arranged at a position expressed as (5×W/8) from one of the long sides (for example, a left-side long side).

After being positioned and arranged, the two wire guide base materials 12 are bonded to the joint ring base material 11X (step S21). In the field A2 in FIG. 16 and a field B2 in FIG. 16 to be described later, laser-welded portions LS are indicated by a row of dots. In a similar manner to the bonding method described earlier, laser welding, spot welding, brazing, or the like can be used as the bonding method.

Next, as shown in the field B2 in FIG. 16, with respect to a first surface being one of two principal surfaces of the rectangular joint ring base material 11Y, for example, two wire guide base materials 12 with circular tube shapes are arranged so that each wire guide base material 12 becomes parallel to a long side of the joint ring base material 11Y (and, therefore, parallel to each other). In this case, a length of the long side of the joint ring base material 11Y and a length of the wire guide base material 12 are equal.

The arrangement is performed based on positioning carried out as follows. A length of a short side of the joint ring base material 11Y is W which is the same as the length of the short side of the joint ring base material 11X. A first wire guide base material 12 is positioned and arranged at a position expressed as (3×W/8) and a second wire guide base material 12 is positioned and arranged at a position expressed as (7×W/8) from one of the long sides (for example, a left-side long side) of the joint ring base material 11Y.

After being positioned and arranged, the two wire guide base materials 12 are bonded to the joint ring base material 11Y by a same bonding method as in step S21 (step S22).

Note that the process of step S21 and the process of step S22 may be performed in a reverse order or may be performed concurrently.

Next, in a state where the joint ring base material 11X to which the two wire guide base materials 12 have been bonded is positioned and fixed, the joint ring base material 11X is cut by, for example, laser machining. Accordingly, the plurality of joint ring main bodies 5Xa are formed in a state of being connected to an outer frame 11Xa and before being subjected to rounding. Two wire guides 5d being cut parts of the two wire guide base materials 12 are formed on the joint ring main bodies 5Xa.

Slightly unlike the configuration shown in FIG. 3, the joint ring main body 5Xa manufactured in the present embodiment is configured such that the first end surface f1 includes a pair of hinge convex portions 5Xb and the second end surface f2 includes a pair of hinge convex portions 5Xb whose positions around the central axis O differ from positions of the pair of hinge convex portions 5Xb of the first end surface f1 by 90 degrees (however, since the joint ring main body 5Xa related to the joint ring 5 at a specific location has a different arrangement of the hinge convex portions 5Xb, a reference sign of the joint ring main body 5Xa is described as 5Xa1).

Therefore, pressing is further performed so that positions in a thickness direction of the hinge convex portion 5Xb and a hinge convex portion 5Yb of the joint ring main body 5Ya (to be described later) are shifted when combined as the bending tube 6. In the pressing, as shown in a field 4 in FIG. 16 to be described later, processing is further performed so that the joint ring main body 5Xa and the joint ring main body 5Ya are arranged on a same plane when the joint ring base material 11X and the joint ring base material 11Y are overlapped with each other.

Subsequently, electrolytic polishing is performed to smooth surfaces and a coat is formed using Defric coating (step S23) (refer to a field A3 in FIG. 16).

With respect to the joint ring base material 11Y to which two wire guide base materials 12 are bonded, by performing cutting by laser machining, pressing, electrolytic polishing, and applying Defric coating in a similar manner to step S23, the plurality of joint ring main bodies 5Ya are formed in a state of being connected to an outer frame 11Ya and before being subjected to rounding (step S24) (refer to a field B3 in FIG. 16). Two wire guides 5e being cut parts of the two wire guide base materials 12 are formed on the joint ring main bodies 5Ya.

Note that, even with respect to the joint ring base material 11Y, since the joint ring main body 5Ya related to the joint rings 5 at specific locations or, more specifically, at both ends of the bending tube 6 has a different arrangement of the hinge convex portions 5Yb, a reference sign of the joint ring main body 5Ya is described as 5Ya1 and 5Ya2.

Note that the process of step S23 and the process of step S24 may be performed in a reverse order or may be performed concurrently.

Subsequently, as shown in the field 4 in FIG. 16, the joint ring base material 11X and the joint ring base material 11Y are overlapped with each other so that corners are aligned. Accordingly, the joint ring main body 5Xa and the joint ring main body 5Ya are alternately arranged on a same plane along a long-side direction of the joint ring base material 11X and the joint ring base material 11Y.

Once the joint ring base material 11X and the joint ring base material 11Y are overlapped with each other, connections between the joint ring main bodies 5Xa and 5Xa1 and the outer frame 11Xa and the joint ring main body 5Ya and the outer frame 11Ya are disconnected with the exception of connections between the joint ring main bodies 5Ya1 and 5Ya2 and the outer frame 11Ya related to the joint rings 5 positioned at both ends of the bending tube 6, and rounding is performed. FIG. 17 is a chart for explaining a process of rounding according to the third embodiment.

A field A in FIG. 17 shows the joint ring main bodies 5Xa and 5Ya with a flat plate shape prior to rounding. As illustrated, the wire guide 5d and the wire guide 5e are alternately arranged at regular intervals. In the step of attaching the plurality of wire guide base material 5e or 5d to the joint ring base material 11X or 11Y, the joint ring base material 11X or 11Y is a flat plate including side surfaces, and a first surface 5Xa to which the plurality of wire guide base material 5e or 5d are attached.

For example, rounding includes a rounding process, a bonding process, and a cutting process.

When rounding is started, first, the rounding process is performed and the joint ring main bodies 5Xa and 5Ya are rounded in an arc shape from, for example, both ends with the first surface to which the wire guides 5d and 5e are bonded on an inner side as shown in a field B in FIG. 17.

As the rounding process further proceeds, the joint ring main bodies 5Xa and 5Ya are formed so that entireties of the joint ring main bodies 5Xa and 5Ya acquire a curved cross section (become curved three-dimensionally) as shown in a field C in FIG. 17.

In addition, when the rounding process ends, the joint ring main bodies 5Xa and 5Ya are formed in a circular tube shape centered on the central axis O as shown in the field C in FIG. 17. Subsequently, both ends of the joint ring main bodies 5Xa and 5Ya (including 5Xa1, 5Ya1, and 5Ya2) are bonded by the bonding process.

Once the bonding process ends, the bending tube 6 connected to the outer frame 11Ya as shown in a 5th field in FIG. 16 is obtained. The bending tube 6 is manufactured from this state by performing a cutting process to cut away the outer frame 11Ya (step S25).

According to the third embodiment described above, a substantially similar effect to the first and second embodiments described earlier can be produced and, at the same time, the adoption of a method of manufacturing the joint rings 5 (the bending tube 6) by separating into two joint ring base materials 11X and 11Y with flat plate shapes, processes of providing the joint rings 5 (the bending tube 6) with parts other than the wire guides 5d and 5e can be made easier.

In addition, since positions of the hinge convex portion 5Xb and the hinge convex portion 5Yb in the thickness direction have been shifted, a bending angle of the bending tube 6 can be increased.

Note that the present disclosure is not limited to the above-described embodiments as it is, and can be embodied by modifying constituent elements without departing from the scope of the disclosure in an implementation stage. In addition, various aspects of the disclosure can be formed by appropriately combining a plurality of constituent elements disclosed in the embodiments. For example, some constituent elements may be deleted from all the constituent elements shown in the embodiments. Furthermore, constituent elements over different embodiments may be appropriately combined. In this manner, various modifications and applications of the present disclosure can obviously be made without departing from the spirit and the scope of the disclosure.

Example 1. A joint ring in which a joint ring main body and a wire guide are bonded to each other, the joint ring comprising:
  the joint ring main body which includes a first end surface and a second end surface; and
  the wire guide which includes a third end surface and a fourth end surface and which is bonded to the joint ring main body, wherein
  in a central axis direction of the joint ring main body, the first end surface and the third end surface are at a same position and the second end surface and the fourth end surface are at a same position.

Example 2. The joint ring according to Example 1, wherein the first end surface, the second end surface, the third end surface, and the fourth end surface are cut surfaces.

Example 3. A manufacturing method of a joint ring comprising bonding a wire guide base material as a base material of a plurality of wire guides to a joint ring base material as a base material of a plurality of joint ring main bodies and cutting the joint ring base material to which the wire guide base material is bonded to manufacture a plurality of joint rings, each of the plurality of joint rings including a wire guide being bonded to a joint ring main body, wherein
  the wire guide base material includes concave portions that are successive in a longitudinal direction, and the manufacturing method of a joint ring comprises:
  bonding a plurality of wire guide base materials to an inner circumferential surface of a tubular joint ring base material such that the plurality of wire guide base materials are parallel to a central axis of the joint ring base material; and
  cutting the joint ring base material to which the plurality of wire guide base materials are bonded to manufacture the plurality of joint rings, the wire guide being bonded to the joint ring main body in each of the plurality of joint rings.

Example 4. The manufacturing method of a joint ring according to Example 3, wherein lengths of the joint ring base material and the wire guide base material are equal.

Example 5. The manufacturing method of a joint ring according to Example 3, wherein the joint ring base material has a circular tube shape.

Example 6. The manufacturing method of a joint ring according to Example 3, wherein, in the wire guide base material, a plate-like body and a tubular body are alternately formed in the longitudinal direction and the concave portions are formed on an inner surface of the tubular body, and the manufacturing method of a joint ring comprises
  performing cutting of the joint ring base material to which the plurality of wire guide base materials are bonded by cutting the plate-like body without cutting the tubular body.

Example 7. The manufacturing method of a joint ring according to Example 6, comprising forming the wire guide base material in which the plate-like body and the tubular body are alternately formed by intermittently cutting a tubular wire guide base material and leaving a surface opposing an inner circumferential surface of the joint ring base material intact.

Example 8. A manufacturing method of a bending tube for endoscope comprising bonding a wire guide base material as a base material of a plurality of wire guides to a joint ring base material as a base material of a plurality of joint rings and cutting the joint ring base material to which the wire guide base material is bonded to manufacture a bending tube in which the plurality of joint rings are coupled to each other, a wire guide being bonded to each of the plurality of joint rings, wherein the wire guide base material includes concave portions that are successive in a longitudinal direction, and the manufacturing method of a bending tube for endoscope comprises:

bonding a plurality of wire guide base materials to an inner circumferential surface of a tubular joint ring base material such that the plurality of wire guide base materials are parallel to a central axis of the joint ring base material;

cutting the joint ring base material to which the plurality of wire guide base materials are bonded to form a hinge configured to enable adjacent joint rings to remain coupled to each other, and a space configured to enable adjacent joint rings to bend without abutting against each other; and manufacturing the bending tube in which the plurality of joint rings are coupled, the wire guide being bonded to each of the plurality of joint rings.

Example 9. The manufacturing method of a bending tube for endoscope according to Example 8, wherein lengths of the joint ring base material and the wire guide base material are equal.

Example 10. The manufacturing method of a bending tube for endoscope according to Example 8, wherein the joint ring base material has a circular tube shape.

Example 11. The manufacturing method of a bending tube for endoscope according to Example 8, wherein, in the wire guide base material, a plate-like body and a tubular body are alternately formed in the longitudinal direction and the concave portions are formed on an inner surface of the tubular body, and the manufacturing method of a bending tube for endoscope comprises performing cutting of the joint ring base material to which the plurality of wire guide base materials are bonded by cutting the plate-like body without cutting the tubular body.

Example. The manufacturing method of a bending tube for endoscope according to Example 11, comprising forming the wire guide base material in which the plate-like body and the tubular body are alternately formed by intermittently cutting a tubular wire guide base material and leaving a surface opposing an inner circumferential surface of the joint ring base material intact.

Example 13. A manufacturing method of a joint ring comprising bonding a wire guide base material as a base material of a plurality of wire guides to a joint ring base material as a base material of a plurality of joint ring main bodies and cutting the joint ring base material to which the wire guide base material is bonded to manufacture a plurality of joint rings, each of the plurality of joint rings including a wire guide being bonded to a joint ring main body, wherein the wire guide base material includes concave portions that are successive in a longitudinal direction, and the manufacturing method of a joint ring comprises:

bonding a plurality of wire guide base materials to a first surface of a flat plate-like joint ring base material such that the plurality of wire guide base materials are parallel to each other;

rounding the joint ring base material around a central axis with the first surface on an inner side so that the plurality of wire guide base materials are parallel to the central axis; and cutting the joint ring base material to which the plurality of wire guide base materials are bonded to manufacture the plurality of joint rings, the wire guide being bonded to the joint ring main body in each of the plurality of joint rings.

Example 14. The manufacturing method of a joint ring according to Example 13, wherein the wire guide base material is a tubular body, and the concave portions are formed on an inner surface of the tubular body.

Example 15. The manufacturing method of a joint ring according to Example 13, wherein, in the wire guide base material, a plate-like body and a tubular body are alternately formed in the longitudinal direction and the concave portions are formed on an inner surface of the tubular body, and the manufacturing method of a joint ring comprises performing cutting of the joint ring base material to which the plurality of wire guide base materials are bonded by cutting the plate-like body without cutting the tubular body.

Example 16. The manufacturing method of a joint ring according to Example 15, comprising forming the wire guide base material in which the plate-like body and the tubular body are alternately formed by intermittently cutting a tubular wire guide base material and leaving a surface opposing the first surface of the joint ring base material intact.

Example 17. A manufacturing method of a bending tube for endoscope comprising bonding a wire guide base material as a base material of a plurality of wire guides to a joint ring base material as a base material of a plurality of joint rings and cutting the joint ring base material to which the wire guide base material is bonded to manufacture a bending tube in which the plurality of joint rings are coupled to each other, a wire guide being bonded to each of the plurality of joint rings, wherein the wire guide base material includes concave portions that are successive in a longitudinal direction, and the manufacturing method of a bending tube for endoscope comprises:

bonding a plurality of wire guide base materials to a first surface of a flat plate-like joint ring base material such that the plurality of wire guide base materials are parallel to each other;

rounding the joint ring base material around a central axis with the first surface on an inner side so that the plurality of wire guide base materials are parallel to the central axis;

cutting the joint ring base material to which the plurality of wire guide base materials are bonded to form a hinge configured to enable adjacent joint rings to remain coupled to each other, and a space configured to enable adjacent joint rings to bend without abutting against each other; and manufacturing the bending tube in which the plurality of joint rings are coupled, the wire guide being bonded to each of the plurality of joint rings.

Example 18. The manufacturing method of a bending tube for endoscope according to Example 17, wherein the wire guide base material is a tubular body, and the concave portions are formed on an inner surface of the tubular body.

Example 19. The manufacturing method of a bending tube for endoscope according to Example 17, wherein, in the wire guide base material, a plate-like body and a tubular body are alternately formed in the longitudinal direction and the concave portions are formed on an inner surface of the tubular body, and the manufacturing method of a bending tube for endoscope comprises:

performing cutting of the joint ring base material to which the plurality of wire guide base materials are bonded by cutting the plate-like body without cutting the tubular body.

Example 20. The manufacturing method of a bending tube for endoscope according to Example 19, comprising forming the wire guide base material in which the plate-like body and the tubular body are alternately formed by intermittently cutting a tubular wire guide base material and leaving a surface opposing the first surface of the joint ring base material intact.

What is claimed is:

1. A joint ring of an endoscope, comprising:
a joint ring body including a joint ring wall having an inner surface, an outer surface, a first end surface, and a second end surface; and
a first wire guide attached to the inner surface of the joint ring wall,
wherein the first wire guide includes a first wire guide body including a first wire guide wall having a third end surface and a fourth end surface,
wherein, in a central axis direction of the joint ring body, at least a first portion of the first end surface and at least a first portion of the third end surface are at a first axial position and at least a first portion of the second end surface and at least a first portion of the fourth end surface are at a second axial position,
wherein the first end surface includes a first recess extending in the central axis direction and having a concave surface, and
wherein the concave surface includes the first portion of the first end surface at the first axial position.

2. The joint ring according to claim 1, further comprising:
a second wire guide attached to the inner surface of the joint ring wall,
wherein the second wire guide includes a second wire guide body including a second wire guide wall having a fifth end surface and a sixth end surface,
wherein in the central axis direction of the joint ring, at least a second portion of the first end surface and at least a first portion of the fifth end surface are at a third axial position, and at least a second portion of the second end surface and at least a first portion of the sixth end surface are at a fourth axial position,
wherein the second end surface includes a first protrusion extending in the central axis direction and having a convex surface, and
wherein the convex surface includes the second portion of the second end surface at the fourth axial position.

3. The joint ring according to claim 2, wherein a length in the central axis direction between the first axial position and the second axial position defines a first axial length and a length in the central axis direction between the third axial position and the fourth axial position defines a second axial length, and
wherein the first axial length is shorter than the second axial length.

4. A joint ring assembly, comprising:
a plurality of joint rings according to claim 3;
a first guide wire located in the first wire guide of each of the plurality of joint rings; and
a second guide wire located in the second wire guide of each of the plurality of joint rings.

5. The joint ring assembly according to claim 4, wherein, in a central axis direction of the joint ring assembly, a first of the plurality of joint rings is positioned adjacent a second of the plurality of joint rings,
wherein the first protrusion on the first of the plurality of joint rings is located in the first recess of the second of the plurality of joint rings, and
wherein the convex surface of the first protrusion on the first of the plurality of joint rings located in the concave surface of the first recess of the second of the plurality of joint rings forms a joint about which the first of the plurality of joint rings pivots relative to the second of the plurality of joint rings.

6. The joint ring according to claim 2, wherein the convex surface of the first protrusion is conformal to the concave surface of the first recess.

7. A method of manufacturing a joint ring, comprising:
attaching a plurality of wire guide base materials to a joint ring base material;
with the plurality of wire guide base materials attached to the joint ring base material, forming a tubular joint ring base material; and
cutting the tubular joint ring base material to manufacture the joint ring,
wherein, in the tubular joint ring base material, each of the plurality of wire guide base materials extends along a central axis of the tubular joint ring base material and each of the plurality of wire guide base materials is spaced apart in a circumferential direction on an inner surface of the tubular joint ring base material.

8. The method according to claim 7, wherein, in the joint ring, each of the plurality of wire guide base materials defines one of a plurality of wire guides, and
wherein, in the joint ring, a length of the joint ring in a central axis direction and a length of at least a portion of the plurality of wire guides are equal.

9. The method according to claim 7, wherein a shape of the tubular joint ring base material is a right cylinder.

10. The method according to claim 7, wherein the wire guide base materials includes a plate-like body and a plurality of tubular bodies formed on the plate-like body, and
wherein cutting the tubular joint ring base material includes cutting the plate-like body bonded to the joint ring base material.

11. The method according to claim 10, further comprising:
manufacturing the wire guide base material,
wherein manufacturing the wire guide base material includes bonding the plate-like body and the tubular body base material intermittently.

12. The method according to claim 7, wherein, in the joint ring, a first one of the plurality of wire guide base materials defines a first wire guide and a second one of the plurality of wire guide base materials defines a second wire guide, and
wherein, in a central axis direction of the joint ring, the first wire guide is longer than a second wire guide.

13. The method according to claim 7, wherein, in the step of attaching the plurality of wire guide base materials to the joint ring base material, the joint ring base material is a flat plate including side surfaces and a first surface to which the plurality of wire guide base materials are attached.

14. The method according to claim 7, wherein the joint ring comprises:
- a joint ring body including a joint ring wall having an inner surface, an outer surface, a first end surface, and a second end surface, and
- a first wire guide attached to the inner surface of the joint ring wall, the first wired guide formed by one of the plurality of wire guide base materials,
- wherein the first wire guide includes a first wire guide body including a first wire guide wall having a third end surface and a fourth end surface, and
- wherein, in a central axis direction of the joint ring body, at least a portion of the first end surface and at least a portion of the third end surface are at a first axial position and at least a portion of the second end surface and at least a portion of the fourth end surface are at a second axial position.

15. A method of manufacturing a bending tube for an endoscope, comprising:
- the method according to claim 7, wherein the joint ring is a first joint ring; and
- cutting the tubular joint ring base material to manufacture a second joint ring.

16. The method according to claim 15, wherein the cutting the tubular joint ring base material includes:
- forming a hinge coupling between the first joint ring and the second joint ring, and
- forming a space between the first joint ring and the second joint ring in a central axis direction of the bending tube, and
- wherein the hinge coupling includes:
- a first recess on a first end surface of the first joint ring, the first recess extending in the central axis direction and having a concave surface, and
- a first protrusion on a second end surface of the second joint ring, the first protrusion extending in the central axis direction and having a convex surface.

\* \* \* \* \*